United States Patent
Engh-Halstvedt et al.

(10) Patent No.: US 9,927,882 B2
(45) Date of Patent: Mar. 27, 2018

(54) PROCESSING PIPELINE CONTROL

(75) Inventors: Andreas Due Engh-Halstvedt, Trondheim (NO); Jorn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 1664 days.

(21) Appl. No.: 13/459,347

(22) Filed: Apr. 30, 2012

(65) Prior Publication Data

US 2012/0303900 A1 Nov. 29, 2012

(30) Foreign Application Priority Data

May 25, 2011 (GB) .................................. 1108769.9

(51) Int. Cl.
*G06F 12/00* (2006.01)
*G06F 13/00* (2006.01)
*G06F 13/28* (2006.01)
*G06F 3/023* (2006.01)
*G06F 3/0489* (2013.01)
*G08C 17/00* (2006.01)
*H04N 5/44* (2011.01)
*H04N 21/426* (2011.01)
*G09G 5/36* (2006.01)

(52) U.S. Cl.
CPC .......... *G06F 3/0238* (2013.01); *G06F 3/0489* (2013.01); *G08C 17/00* (2013.01); *H04N 5/4403* (2013.01); *H04N 21/42653* (2013.01); *G09G 5/363* (2013.01); *H04N 2005/4441* (2013.01)

(58) Field of Classification Search
CPC ............................. G06F 3/0238; G06F 3/0489
USPC .......................................................... 711/125
See application file for complete search history.

(56) References Cited

U.S. PATENT DOCUMENTS 4,433,374 A   2/1984  Hanson et al.
4,965,764 A  10/1990  Aono
(Continued)

FOREIGN PATENT DOCUMENTS

CN   101243420   8/2008
CN   101354641   1/2009
(Continued)

OTHER PUBLICATIONS

Search Report for UK 1108769.9, dated Sep. 16, 2011.
(Continued)

*Primary Examiner* — Charles Rones
*Assistant Examiner* — Sidney Li
(74) *Attorney, Agent, or Firm* — Nixon & Vanderhye P.C.

(57) ABSTRACT

A graphics processing unit 2 includes a texture pipeline 6 having a first pipeline portion 18 and a second pipeline portion 20. A subject instruction within the first pipeline portion 18 is recirculated within the first pipeline portion 18 until descriptor data to be loaded from a memory 4 by that subject instruction has been cached within a shared descriptor cache 22. When the descriptor has been stored within the shared descriptor cache 22, then the subject instruction is passed to the second pipeline portion 20 where further processing operations are performed and the subject instruction recirculated until those further processing operations have completed. The descriptor data is locked within the shared descriptor cache 22 until there are no pending subject instructions within the texture pipeline 6 which required to use that descriptor data.

16 Claims, 5 Drawing Sheets

(56) References Cited

U.S. PATENT DOCUMENTS

| | | | |
|---|---|---|---|
| 5,375,227 A | 12/1994 | Akatsu et al. | |
| 6,236,413 B1 * | 5/2001 | Gossett | G06T 1/20 |
| | | | 345/426 |
| 6,259,460 B1 * | 7/2001 | Gossett | G06T 1/60 |
| | | | 345/506 |
| 7,542,043 B1 | 6/2009 | Lindholm et al. | |
| 2004/0083341 A1 * | 4/2004 | Robinson | G06F 12/126 |
| | | | 711/133 |
| 2008/0150949 A1 * | 6/2008 | Wei | G06T 15/005 |
| | | | 345/506 |
| 2008/0276079 A1 | 11/2008 | Luick | |
| 2008/0313435 A1 | 12/2008 | Orion et al. | |
| 2009/0198972 A1 | 8/2009 | Nystad et al. | |

FOREIGN PATENT DOCUMENTS

| | | |
|---|---|---|
| CN | 101563712 | 10/2009 |
| JP | 64-1046 | 1/1989 |
| JP | 2003-515798 | 5/2003 |
| JP | 2004-259049 | 9/2004 |
| JP | 2007-525768 | 9/2007 |
| JP | 2010-515122 | 5/2010 |

OTHER PUBLICATIONS

Chinese First Office Action dated Nov. 13, 2015 in CN 201210172501.9 and English translation, 21 pages.

Japanese Office Action dated Oct. 5, 2015 in JP 2012-094511 and English translation, 29 pages.

"English ARM, Announcement of New GPU 'ARM Mali-T604' Performance Improvement by New Architecture 'Dry Pipe'" Nikkei Electronics, Nikkei Business Publications, Inc., Nov. 29, 2010, No. 1044, pp. 84-85.

Japanese Office Action dated May 23, 2016 in JP 2012-094511 and English translation, 17 pages.

English translation of Chinese Second Office Action dated Jun. 22, 2016 in CN 201210172501.9, 9 pages.

* cited by examiner

PROCESSING PIPELINE CONTROL

This application claims priority to GB Application No. 1108769.9 filed May 25, 2011, the entire contents of which are incorporated herein by reference.

BACKGROUND

This invention relates to the field of data processing systems. More particularly, this invention relates to data processing systems including processing pipelines and to the control of the processing pipelines within such data processing systems.

It is known to provide data processing systems that incorporate processing pipelines so as to increase the degree of parallel execution within the data processing system and accordingly increase the number of instructions executed per cycle. Increasing the number of pipeline stages within a processing pipeline increases the number of program instructions that can be executed in parallel. However, processing pipelines with a large number of pipeline stages have difficulty in efficiently handling instructions which fail. For an example, should a load instruction progressing along a processing pipeline fail to receive its loaded data within the expected time, then one approach would be for it to stall the processing pipeline. This would be highly inefficient. Another approach, if there are no later instructions dependent upon the failed load instruction, is to allow the load instruction to progress along the processing pipeline as a processing "bubble" in step with the other program instructions progressing through the pipeline and accordingly not disturb the execution of those other processing instructions. A problem with this approach is that the presence of the bubble within the pipeline reduces the number of program instructions which are being executed in parallel and accordingly reduces the overall executed instructions per cycle value.

SUMMARY

Viewed from one aspect the present invention provides apparatus for processing data comprising:
a memory configured to store data;
a cache configured to store data fetched from said memory; and
a processing pipeline having a plurality of pipeline stages and configured to perform data processing operations specified by program instructions passing along said processing pipeline, wherein
said processing pipeline comprises a first pipeline portion having a plurality of pipeline stages followed by a second pipeline portion having a plurality of pipeline stages;
said first pipeline portion includes a load stage configured to respond to a subject instruction using target data, when said target data is not already stored within said cache, by fetching said target data from said memory and storing said target data within said cache;
said first pipeline portion includes a first gating stage following said load stage and configured to determine if said target data is present within said cache and:
  (i) if said target data is not present within said cache, then to recirculate said subject instruction through said first pipeline portion; and
  (ii) if said target data is present within said cache, then to pass said subject instruction to said second pipeline portion;

said second pipeline portion includes a further processing stage configured to respond to said subject instruction by performing a further processing operation using said target data; and
said second pipeline portion includes a second gating stage following said further processing stage and configured to determine if said further processing operation is completed and:
  (i) if said further processing operation is not completed, then to recirculate said subject instruction through said second pipeline portion; and
  (ii) if said further processing operation is completed, then to retire said subject instruction from said processing pipeline.

The invention provides a processing pipeline which includes a first pipeline portion and a second pipeline portion. The first pipeline portion serves to load target data in to a cache memory and then check that the target data has been loaded. If the target data has not been loaded, then the subject instruction is recirculated (returned to a proceeding pipeline stage) within the first pipeline portion and is not passed on to the second pipeline portion. This prevents a processing bubble being passed to the second pipeline portion and gives the first pipeline portion further time to complete the subject instruction. The second pipeline portion itself serves to perform further processing operations and includes a second gating stage which checks to determine whether or not those further processing operations have been completed. If the further processing operations have not been completed, then the subject instruction is recirculated within the second pipeline portion to give more time for the further processing operations to complete. If the second gating stage determines that the further processing operation is complete, then the subject instruction may be retired. The processing pipeline thus includes two loops, one formed by the first pipeline portion and one formed by the second pipeline portion. The subject instruction recirculates within the first pipeline portion until the target data for that subject instruction is stored within the cache. Once the target data has been gathered and is available within the cache, then the subject instruction is released in to the second pipeline portion within which it can recirculate, if necessary, until the further processing operations performed by that second pipeline portion are completed and the subject instruction retired.

In preferred embodiments of the invention the target data may be locked within the cache until all program instructions that use the target data have been retired from the processing pipeline. In this way, efficiency may be raised since target data which has been placed in to the cache by the operation of the first pipeline portion will be held within that cache until it is no longer required. This reduces the likelihood of processing bubbles arising within the second pipeline portion.

While it will be appreciated that the target data can take a wide variety of different forms, in some embodiments the target data is descriptor data specifying one or more properties of further target data, with the further processing operation serving to fetch the further target data from the memory in dependence upon the target data stored within the cache. The further processing operations are thus ones in which a fetch of data from memory is indirectly specified in dependence upon target data and accordingly, it is important that the target data should be stored within the cache memory by the operation of the first pipeline portion before it is worthwhile attempting to perform the further processing operations to fetch the further target data in the second pipeline portion.

The first gating circuitry and the second gating circuitry served to recirculate the subject instruction to a proceeding stage which may be one of a first stage or an intermediate stage within the pipeline portion concerned.

It is possible that the second pipeline portion may follow directly after the first pipeline portion. However, in other embodiments the processing pipeline comprises one or more intervening stages between the first pipeline portion and the second pipeline portion.

It will be appreciated that the present technique may be applied to processing pipelines of a wide variety of different forms and applications. However, the present technique is well suited to embodiments in which the processing pipeline is a texture pipeline within a graphics processing unit. Such a texture pipeline typically has a high requirement for loading data from memory with further processing operations within the texture pipeline being dependent upon previously loaded data. Within this context the present technique which ensures that the target data is stored within the cache before permitting the subject instruction to progress beyond the first pipeline portion and thereby improves efficiency by reducing the number of processing bubbles which arise within the processing pipeline downstream of the first pipeline portion.

The further target data may be texture data and the target data may be descriptor data specifying one or more parameters of the texture data. These parameters may, for example, be used to locate the storage address of texture data to be utilised for a particular pixel.

The target data may be reused by a large number of subject instructions and efficiency may be improved if the target data stored within the cache is shared. State data stored in respect of each subject instruction as it passed through the processing pipeline can include values specifying storage locations within the cache of the shared target data.

The subject instruction may be one of a group of subject instructions that share target data and are processed together with the state data identifying each subject instruction within the group of program instructions (e.g. the group of subject instructions may relate to four adjacent pixel values to be processed together as a quad).

The target data for the group of subject instructions will be locked in the cache until all of the group of subject constructions have completed their use of the shared target data.

The efficiency of processing pipelines is generally increased when the subject instructions within the processing pipeline are taken from different program threads such that there is no interdependence between the subject instructions. Thread dispatching circuitry may be configured to dispatch subject instructions in to the processing pipeline for processing and thread retirement circuitry may be used to retire subject instructions from the processing pipeline when they have completed.

Viewed from another aspect the present invention provides apparatus for processing data comprising:
  memory means for storing data;
  cache means for storing data fetched from said memory means; and
  processing pipeline means for performing data processing operations specified by program instructions passing along said processing pipeline means, said processing pipeline means having a plurality of pipeline stage means for performing data processing operations, wherein
  said processing pipeline means comprises a first pipeline portion having a plurality of pipeline stage means followed by a second pipeline portion having a plurality of pipeline stage means;
  said first pipeline portion includes load stage means for responding to a subject instruction using target data, when said target data is not already stored within said cache means, by fetching said target data from said memory means and storing said target data within said cache means;
  said first pipeline portion includes, following said load stage means, first gating stage means for determining if said target data is present within said cache means and:
    (i) if said target data is not present within said cache means, then to recirculate said subject instruction through said first pipeline portion; and
    (ii) if said target data is present within said cache means, then to pass said subject instruction to said second pipeline portion;
  said second pipeline portion includes further processing stage means for responding to said subject instruction by performing a further processing operation using said target data; and
  said second pipeline portion includes, following said further processing stage means, second gating stage means for determining if said further processing operation is completed and:
    (i) if said further processing operation is not completed, then to recirculate said subject instruction through said second pipeline portion; and
    (ii) if said further processing operation is completed, then to retire said subject instruction from said processing pipeline means.

Viewed from a further aspect the present invention provides a method of processing data comprising the steps of:
  storing data within a memory;
  storing within a cache data fetched from said memory; and
  performing within a processing pipeline data processing operations specified by program instructions passing along said processing pipeline, said processing pipeline having a plurality of pipeline stages, wherein
  said processing pipeline means comprises a first pipeline portion having a plurality of pipeline stages followed by a second pipeline portion having a plurality of pipeline stages; and further comprising:
  using a load stage within said first pipeline portion to respond to a subject instruction using target data, when said target data is not already stored within said cache, by fetching said target data from said memory and storing said target data within said cache;
  using a first gating stage following said load stage within said first pipeline portion to determine if said target data is present within said cache and:
    (i) if said target data is not present within said cache, then recirculating said subject instruction through said first pipeline portion; and
    (ii) if said target data is present within said cache, then passing said subject instruction to said second pipeline portion;
  using a further processing stage within said second pipeline portion to respond to said subject instruction by performing a further processing operation using said target data; and using a second gating stage following said further processing stage within said second pipeline portion to determine if said further processing operation is completed and:
(i) if said further processing operation is not completed, then recirculating said subject instruction through said second pipeline portion; and
(ii) if said further processing operation is completed, then retiring said subject instruction from said processing pipeline means.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
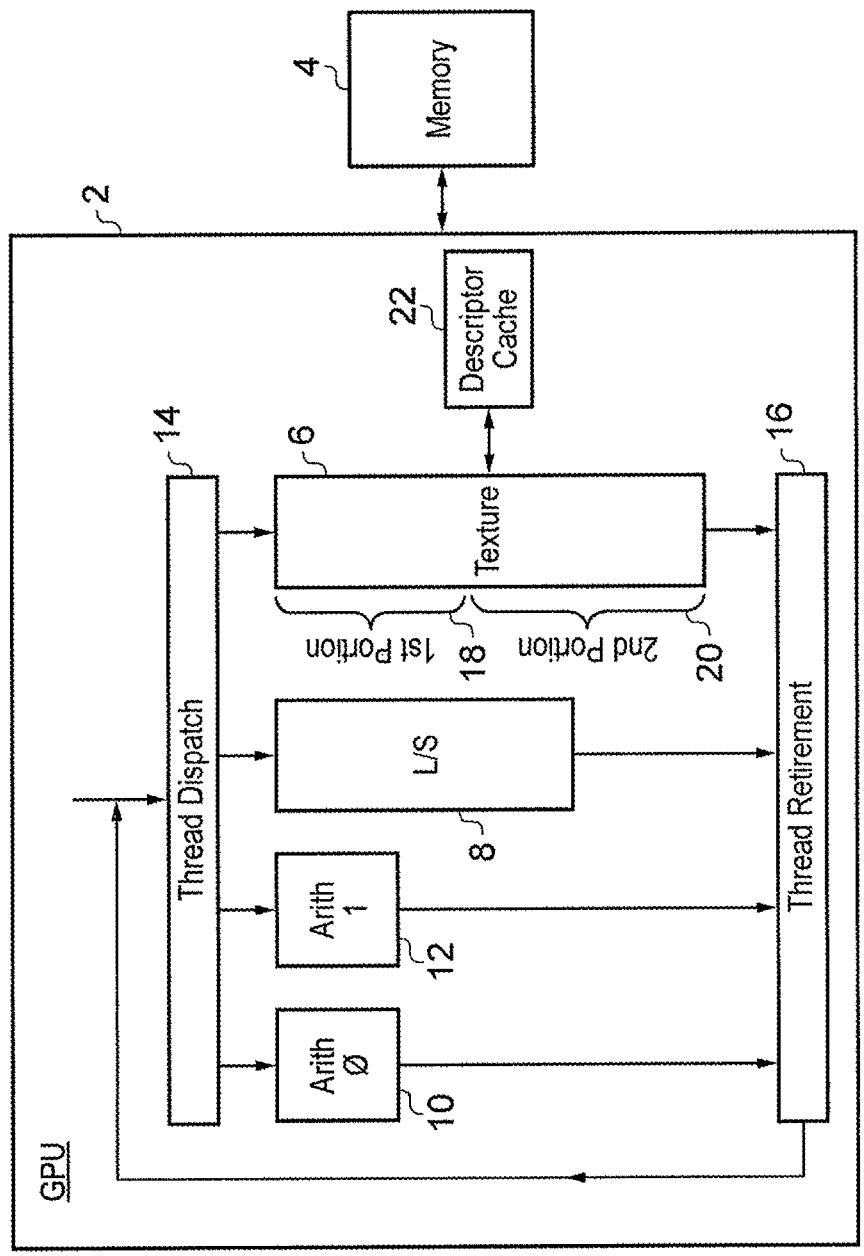
FIG. 1 schematically illustrates a graphics processing unit including a plurality of processing pipelines.

FIG. 1 schematically illustrates a graphics processing unit 2 coupled to a memory 4. The memory 4 stores program data, texture data, descriptor data and other data required for graphics processing, as will be familiar to those in the field of graphics processing. The graphics processing unit 2 includes a plurality of processing pipelines including a texture pipeline 6, a load store pipeline 8, a first arithmetic pipeline 10 and a second arithmetic pipeline 12. Thread dispatch circuitry 14 dispatches program instructions in to an appropriate processing pipeline 6, 8, 10, 12 and thread retirement circuitry 16 retires program instructions from the processing pipelines 6, 8, 10, 12, as well as retiring processing threads when they are completed in their entirety. It will be appreciated that the pipeline arrangement FIG. 1 is simply an example of a processing apparatus including a processing pipeline and many other different forms of processing apparatus may be used as well as many other different forms of graphics processing unit.

The texture pipeline in 6 in FIG. 1 is illustrated as having a first pipeline portion 18 and a second pipeline portion 20. The first pipeline portion 18 is responsible for fetching descriptor data from the memory 4 and storing it within a shared descriptor cache 22 which is closely coupled to the texture pipeline 6. The second portion of the pipeline 20 is responsible for fetching texture data from the memory 4 in dependence upon the descriptor data stored within the descriptor cache 22. Further portions of the texture pipeline 6 may perform other processing operations, such as filtering and pixel manipulation.

In FIG. 1, the memory 4 is illustrated as a unified block. However, it will be appreciated that in practice the memory 4 may comprise a memory hierarchy formed of multiple levels of cache memory, main memory and non-volatile data storage, such as a hard disk drive.

Figure 2:
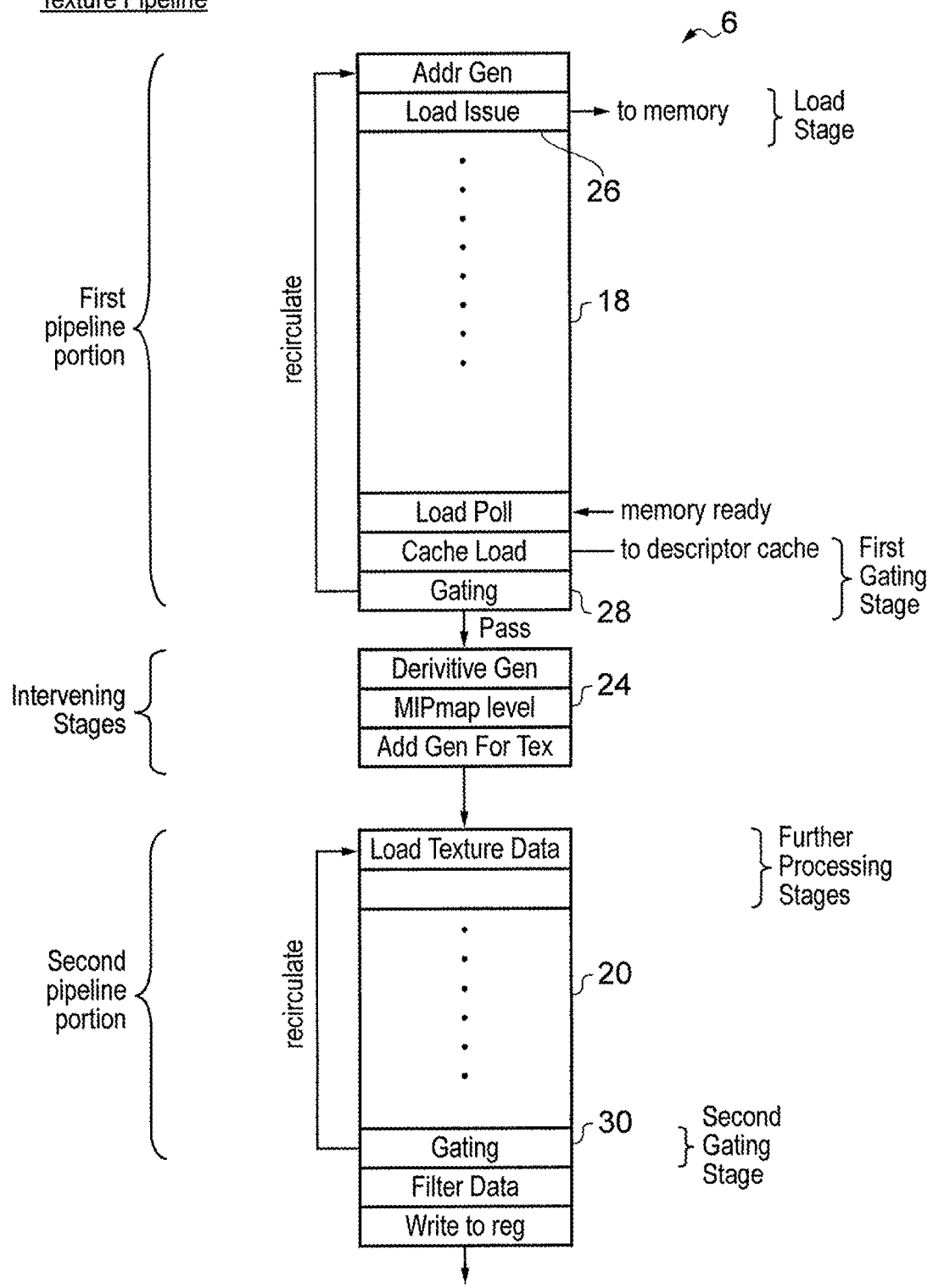
FIG. 2 schematically illustrates a texture pipeline including a first pipeline portion and a second pipeline portion.

FIG. 2 schematically illustrates the texture pipeline 6 in more detail. In particular, the texture pipeline 6 includes a first pipeline portion 18, a plurality of intervening pipeline stages 24 and a second pipeline portion 20. The first pipeline portion 18 includes a load stage 26 which is responsive to a subject instruction (e.g. an instruction seeking to load the texture of a pixel) to issue a request to the memory 4 to fetch descriptor data to be subsequently used in determining an address of texture data to be retrieved. A later stage within the first pipeline portion 18 serves to poll whether or not the memory has returned the requested descriptor data and, if the data has been returned, then a cache load stage serves to load the returned descriptor data in to the shared descriptor cache 22. A first gating stage 28 within the first pipeline portion 18 serves to determine whether or not the descriptor data (target data) has been loaded in to the shared descriptor cache 22 when the subject instruction reaches the first gating stage 28. If the descriptor data (target data) is present within the shared descriptor cache 22, then the subject instruction is passed on to the intervening stages 24 and then on to the second pipeline portion 20. If the descriptor data is not present within the shared descriptor cache 22, then the subject instruction is recirculated by returning it to the top of the first pipeline portion 18 so that it may pass through the first pipeline portion again and accordingly get more time for the descriptor data to be returned form the memory 4. This avoids passing the subject instruction which does not yet have its required descriptor data present within the shared descriptor cache 22 on to the subsequent portions of the pipeline comprising the intervening stages 24 and the second pipeline portion 20 thereby avoiding introducing unwanted processing bubbles within these later portions of the texture pipeline 6.

When a subject instruction has been passed by the first gating stage 28, it progresses to the intervening stages 24 where further processing operations are performed, such as derivative generation determining the rate of change of pixel values, texture map level selection and address generation for the texture data to be loaded from the memory 4. The subject instruction is then passed to the second pipeline portion 20 which includes further processing stages which perform further processing operations, such as loading the texture data from the memory 4. A second gating stage 30 at the end of the second pipeline portion 20 determines whether or not the further processing operations to be performed by the further processing stages have been completed. In a similar way as for the first pipeline portion 18, the further processing operations may be completed when the texture data has actually returned. If the further processing operations have not been completed, then the subject instruction is recirculated within the second pipeline portion 20 so as to permit more time for the texture data to be returned. When the texture data has been returned, it may be subject to processing operations within the texture pipeline 6 subsequent to the second pipeline portion, such as applying a filter operation to the retrieved texture data and writing the derived colour value to a register.

Figure 3:
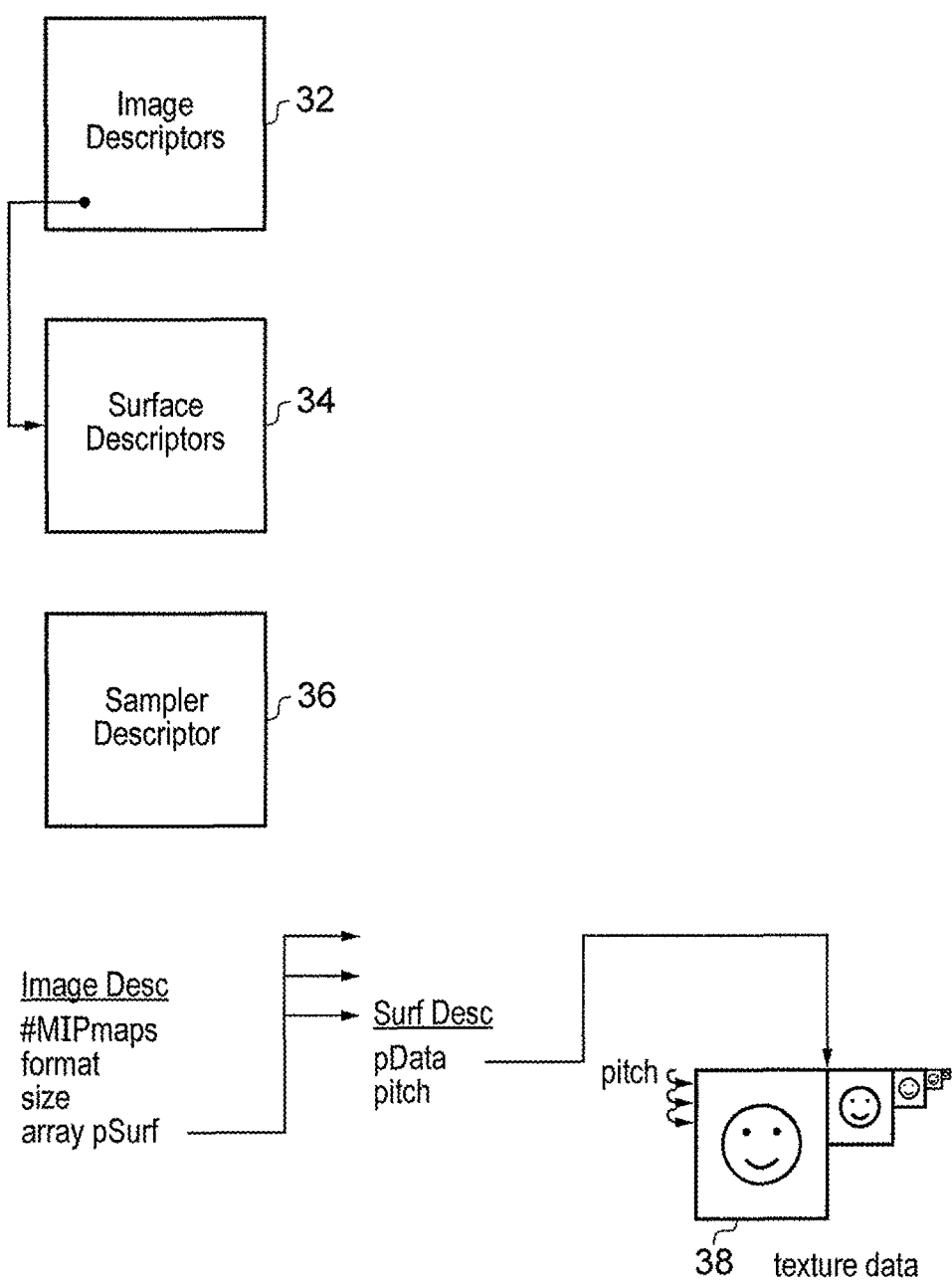
FIG. 3 schematically illustrates the relationship between descriptor data and texture data processed by the texture pipeline.

FIG. 3 schematically illustrates the relationship between descriptor data and texture data. The descriptor data may comprise image descriptors 32, surface descriptors 34 and sampler descriptors 36. All of these descriptors 32, 34, 36 are stored within the memory 4 and are used by the texture pipeline 6 to determine what portions of texture data 38 to read from the memory 4 and how to process that retrieved texture data. In particular, the image descriptor data retrieved for a subject instruction may include data specifying which of a plurality of representations of a texture are to be used given the scaling of that texture that is currently employed, the format of the texture data (e.g. RGB etc.), the size of the texture data and a pointer to a surface descriptor for the texture data concerned. The surface descriptor contains a pointer to the memory address of the start of the relevant instance of the texture data to be employed together with a pitch value indicating the line pitch of that instance of the texture data.

The relationship illustrated in FIG. 3 between the descriptor data and the texture data is one example of a relationship between target data stored in to a cache within a first pipeline portion 18 and further target data retrieved in dependence upon the cache target data by a second pipeline portion 20. The present techniques are not limited to this example, or indeed the field of graphics processing.

Figure 4:
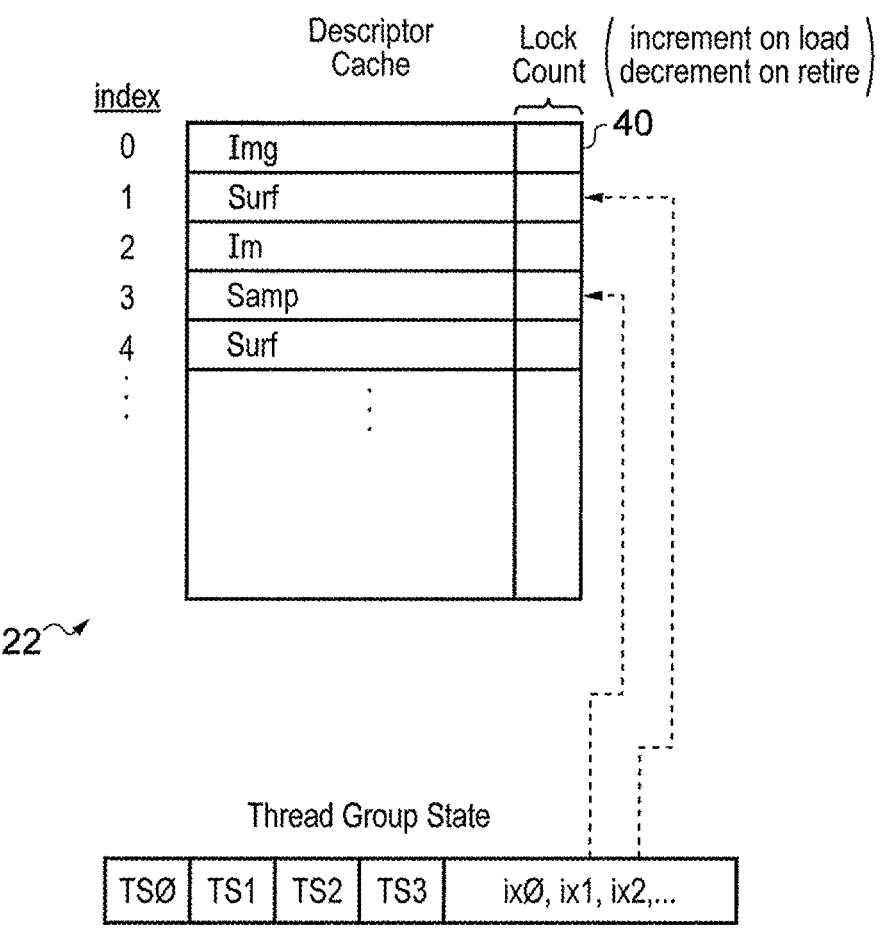
FIG. 4 schematically illustrates a shared descriptor cache and a group of program instructions that share descriptor data.

FIG. 4 schematically illustrates the shared descriptor cache 22 comprising a plurality of cache lines each storing a shared instance of descriptor data and having an associated index value. In this example the shared descriptor cache 22 is indexed, but in other example embodiments it is possible that stored tag values could be used to identify particular descriptor data it is desired to retrieve from the shared descriptor cache 22. Also illustrated in FIG. 4 is that each cache line of the shared descriptor cache 22 includes a lock counter field 40 which stores a count value indicating how many of subject instructions within the texture pipeline 6 that are undergoing processing require to use the descriptor concerned. Each time a subject instruction seeks to load a descriptor, whether or not that descriptor is already cached, the lock count will be incremented so as to indicate that a subject instruction which wishes to use that descriptor is present within the texture pipeline 6. Each time a subject instruction is retired from the texture pipeline 6 such that is has completed its use of the descriptors it references, then the relevant lock count values for those descriptors are decremented. Thus, when the lock count reaches zero, all of the subject instructions within the texture pipeline 6 will have completed their use of that descriptor and it may be unlocked within the shared descriptor cache and accordingly subject to cache line replacement to make way for other descriptor values.

Also illustrated in FIG. 4 is thread group state 42. Groups of subject instructions may be processed together and share the descriptors they use. In this case, the thread group state identifies each of the subject instructions with identifiers TS0, TS1, TS2, TS3 as well as storing, in this example embodiment, index values pointing to the cache lines where the descriptors to be used by the subject instructions within that thread group are located.

Figure 5:
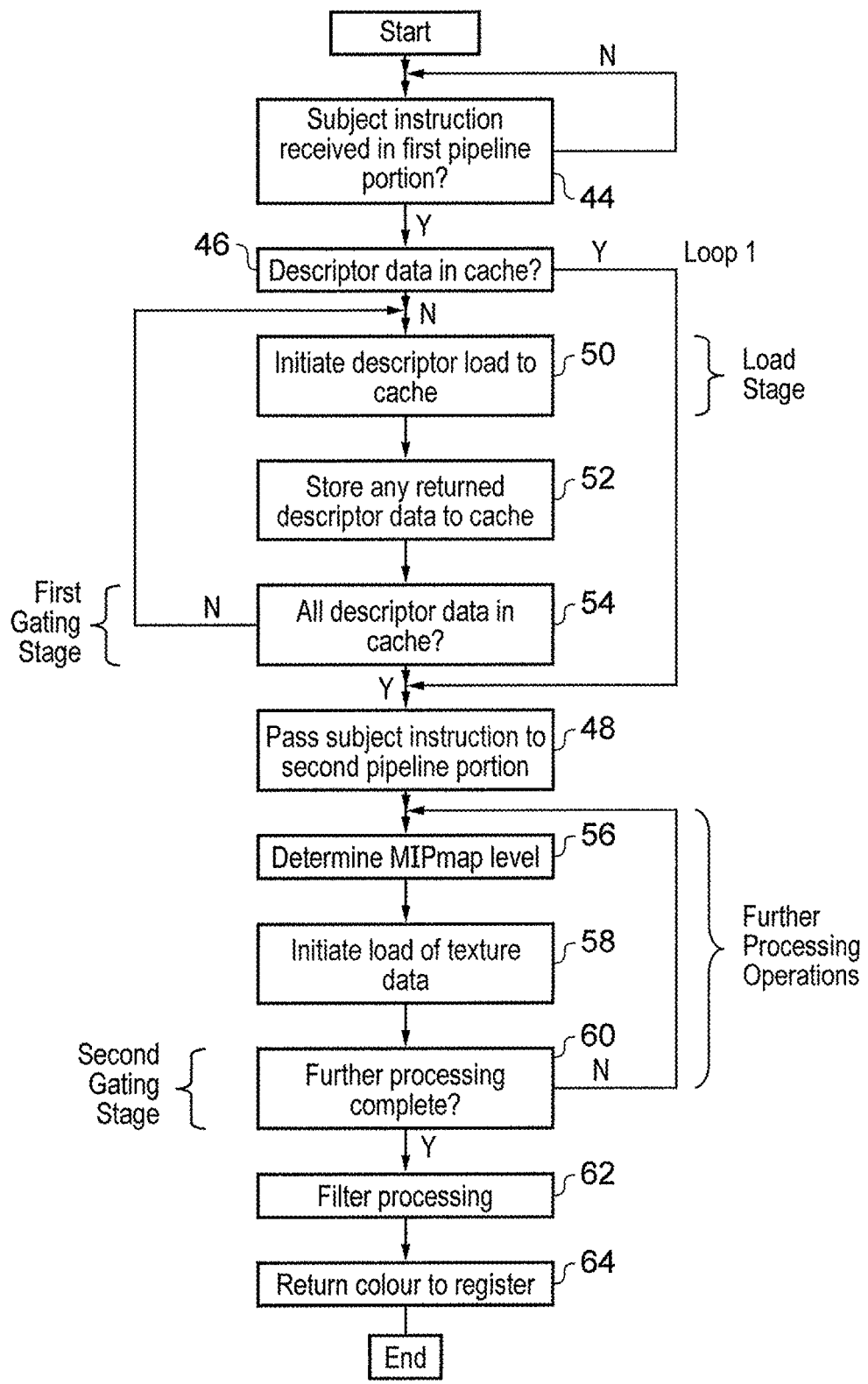
FIG. 5 is a flow diagram schematically illustrating the operation of the texture pipeline of FIG. 2.

FIG. 5 is a flow diagram schematically illustrating the operation of the texture pipeline of FIG. 2. At step 44, processing waits until a subject instruction is received in the first pipeline portion 18. Step 46 then determines whether or not the descriptor data for that subject instruction is already present within the shared descriptor cache 22. If the descriptor data is already present, then processing advances to step 48. If the descriptor data is not already present within the shared descriptor cache 22, then step 50 serves to initiate a descriptor load from the memory 4 to the shared descriptor cache 22. Step 52 stores any returned descriptor data to the shared cache 22. Step 54 is performed by the first gating stage 28 and determines whether all the descriptor data required by the subject instruction is now present within the shared descriptor cache or the descriptor data is not yet present. If it is not present, then the subject instruction is recirculated and processing returns to step 50.

If the all the descriptor data is determined to be present within the shared descriptor cache 22, then processing proceeds to step 48 where a subject instruction is passed to the second pipeline portion 20, possibly, via one or more intervening stages 24. Step 56 determines the texture map level to be used given the resolution of the portion of the image to be drawn relative to the texture map data stored. Step 58 then initiates a load of the texture data. This load of the texture data is from an address within the memory 4 which is calculated in dependence upon the descriptor data which is stored within the shared descriptor cache 22. Step 60 is performed by the second gating stage 30 and determines whether or not the further processing operations are complete. If the further processing operations are not complete, then processing returns to step 56. If the further processing operations are complete, then processing proceeds to step 62 where a filtering operation is performed before the colour pixel value calculated is written to a register at step 64, as the result of the subject instruction which has been processed by the texture pipeline 6.

It will be appreciated that the processing performed by the texture pipeline 6 will also incorporate the cache locking as previously described in relation to FIG. 4, with the lock value being incremented and decremented so as to track the number of "in flight" subject instructions within the texture pipeline.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:
1. Apparatus for processing data comprising:
a memory configured to store data;
a cache configured to store data fetched from said memory; and
a processing pipeline having a plurality of pipeline stages and configured to perform data processing operations specified by program instructions passing along said processing pipeline, wherein
said processing pipeline comprises a first pipeline portion having a plurality of pipeline stages followed by a second pipeline portion having a plurality of pipeline stages;
said first pipeline portion includes a load stage configured to respond to a subject instruction using target data, when said target data is not already stored within said cache, by fetching said target data from said memory and storing said target data within said cache;
said first pipeline portion includes a first gating stage following said load stage and configured to determine if said target data is present within said cache and:
(i) if said target data is not present within said cache, then to recirculate said subject instruction through said first pipeline portion; and
(ii) if said target data is present within said cache, then to pass said subject instruction to said second pipeline portion;
said second pipeline portion includes a further processing stage configured to respond to said subject instruction by performing a further processing operation using said target data; and
said second pipeline portion includes a second gating stage following said further processing stage and configured to determine if said further processing operation is completed and:

(i) if said further processing operation is not completed, then to recirculate said subject instruction through said second pipeline portion; and (ii) if said further processing operation is completed, then to retire said subject instruction from said processing pipeline, wherein said target data is locked within said cache until all program instructions that use said target data have been retired from said processing pipeline.

2. Apparatus as claimed in claim 1, wherein said target data is descriptor data specifying one or more properties of further target data and said further processing operation fetches said further target data from said memory in dependence upon said target data stored within said cache.

3. Apparatus as claimed in claim 2, wherein said second pipeline portion determines a storage location within said memory of said further target data using said target data.

4. Apparatus as claimed in claim 1, wherein said first gating stage recirculates said subject instruction by returning said subject instruction to one of a first stage within said first pipeline portion and an intermediate stage within said first pipeline portion.

5. Apparatus as claimed in claim 1, wherein said second gating stage recirculates said subject instruction by returning said subject instruction to one of a first stage within said second pipeline portion and an intermediate stage within said second pipeline portion.

6. Apparatus as claimed in claim 1, wherein said processing pipeline comprises one or more intervening stages between said first pipeline portion and said second pipeline portion.

7. Apparatus as claimed in claim 1, wherein said processing pipeline is a texture pipeline within a graphics processing unit.

8. Apparatus as claimed in claim 7, wherein said further target data is texture data and said target data is descriptor data specifying one or more parameters of said texture data.

9. Apparatus as claimed in claim 7, wherein said graphics processing unit comprises one or more further processing pipelines.

10. Apparatus as claimed in claim 1, wherein said processing pipeline is configured to store state data for said subject instruction as it passes through said processing pipeline, said state data including values specifying storage locations within said cache of said target data.

11. Apparatus as claimed in claim 10, wherein said subject instruction is one of a group of subject instructions that share target data, said state data identifying each subject instruction of said group of subject instructions.

12. Apparatus as claimed in claim 10, wherein said target data is locked in said cache until at least all of said group of subject instructions that share said target data have completed their use of said shared target data.

13. Apparatus as claimed in claim 1, wherein said subject instruction is part of a program thread and said processing pipeline is configured to process in parallel a plurality of subject instructions each from a different program thread.

14. Apparatus as claimed in claim 1, comprising thread dispatching circuitry configured to dispatch said subject instruction to said processing pipeline for processing.

15. Apparatus for processing data comprising:
memory means for storing data;
cache means for storing data fetched from said memory means; and
processing pipeline means for performing data processing operations specified by program instructions passing along said processing pipeline means, said processing pipeline means having a plurality of pipeline stage means for performing data processing operations, wherein said processing pipeline means comprises a first pipeline portion having a plurality of pipeline stage means followed by a second pipeline portion having a plurality of pipeline stage means;

said first pipeline portion includes load stage means for responding to a subject instruction using target data, when said target data is not already stored within said cache means, by fetching said target data from said memory means and storing said target data within said cache means;

said first pipeline portion includes, following said load stage means, first gating stage means for determining if said target data is present within said cache means and:

(i) if said target data is not present within said cache means, then to recirculate said subject instruction through said first pipeline portion; and (ii) if said target data is present within said cache means, then to pass said subject instruction to said second pipeline portion;

said second pipeline portion includes further processing stage means for responding to said subject instruction by performing a further processing operation using said target data; and said second pipeline portion includes, following said further processing stage means, second gating stage means for determining if said further processing operation is completed and:

(i) if said further processing operation is not completed, then to recirculate said subject instruction through said second pipeline portion; and (ii) if said further processing operation is completed, then to retire said subject instruction from said processing pipeline means, wherein said target data is locked within said cache until all program instructions that use said target data have been retired from said processing pipeline means.

16. A method of processing data comprising the steps of:
storing data within a memory;
storing within a cache data fetched from said memory; and
performing within a processing pipeline data processing operations specified by program instructions passing along said processing pipeline, said processing pipeline having a plurality of pipeline stages, wherein said processing pipeline comprises a first pipeline portion having a plurality of pipeline stages followed by a second pipeline portion having a plurality of pipeline stages; and further comprising:

using a load stage within said first pipeline portion to respond to a subject instruction using target data, when said target data is not already stored within said cache, by fetching said target data from said memory and storing said target data within said cache;

using a first gating stage following said load stage within said first pipeline portion to determine if said target data is present within said cache and:

(i) if said target data is not present within said cache, then recirculating said subject instruction through said first pipeline portion; and (ii) if said target data is present within said cache, then passing said subject instruction to said second pipeline portion;

using a further processing stage within said second pipeline portion to respond to said subject instruction by performing a further processing operation using said target data; and using a second gating stage following said further processing stage within said second pipeline portion to determine if said further processing operation is completed and:

(i) if said further processing operation is not completed, then recirculating said subject instruction through said second pipeline portion; and (ii) if said further processing operation is completed, then retiring said subject instruction from said processing pipeline, wherein said target data is locked within said cache until all program instructions that use said target data have been retired from said processing pipeline.

* * * * *